(12) United States Patent
Fish (10) Patent No.: US 10,285,484 B2
(45) Date of Patent: May 14, 2019

(54) ASSEMBLY AND METHOD OF USE FOR A CONVENIENT PERSONAL CARE PRODUCT STORAGE AND DISPENSARY

(71) Applicant: Breath Scenter, LLC, Atlanta, GA (US)

(72) Inventor: Jacob Fish, Atlanta, GA (US)

(73) Assignee: Breath Scenter, LLC, Atlanta, GA (US)

( * ) Notice: Subject to any disclaimer, the term of this patent is extended or adjusted under 35 U.S.C. 154(b) by 0 days.

(21) Appl. No.: 14/709,946

(22) Filed: May 12, 2015

(65) Prior Publication Data

US 2015/0320178 A1    Nov. 12, 2015

Related U.S. Application Data

(60) Provisional application No. 61/991,907, filed on May 12, 2014.

(51) Int. Cl.
| | | |
|---|---|---|
| A45D 34/00 | (2006.01) | |
| A45D 40/00 | (2006.01) | |
| F16M 13/02 | (2006.01) | |
| F16B 1/00 | (2006.01) | |

(52) U.S. Cl.
CPC ............. *A45D 34/00* (2013.01); *A45D 40/00* (2013.01); *F16B 1/00* (2013.01); *F16M 13/022* (2013.01); *A45D 2034/002* (2013.01); *A45D 2040/0006* (2013.01); *F16B 2001/0035* (2013.01); *Y10T 29/49819* (2015.01)

(58) Field of Classification Search
CPC ....... B67D 7/40; B67D 7/403; E05B 73/0011; A45F 5/004; A45D 34/00; A45D 40/00; A45D 2034/002; A45D 2040/0006; F16M 13/022; F16B 1/00; F16B 2001/0035; Y10T 29/49819
USPC .............. 206/730–735; 248/551, 579; 211/4, 211/71.01; 222/160, 173, 179.5
See application file for complete search history.

(56) References Cited

U.S. PATENT DOCUMENTS

| | | | | |
|---|---|---|---|---|
| 4,211,330 A | | 7/1980 | Stock | |
| 4,898,532 A | | 2/1990 | Bercik | |
| 4,927,354 A | * | 5/1990 | Sanford | .................... F23Q 2/34 |
| | | | | 206/87 |
| 5,638,810 A | | 6/1997 | Yavitz | |
| 5,685,436 A | * | 11/1997 | Davet | .................... A47F 7/024 |
| | | | | 211/163 |
| 5,706,977 A | * | 1/1998 | Ogura | ...................... A47F 1/08 |
| | | | | 221/197 |
| 5,774,925 A | | 7/1998 | Pryor, III | |
| 5,779,654 A | | 7/1998 | Foley et al. | |

(Continued)

*Primary Examiner* — Paul R Durand
*Assistant Examiner* — Andrew P Bainbridge
(74) *Attorney, Agent, or Firm* — Sandberg Phoenix & von Gontard, P.C.

(57) ABSTRACT

An assembly and method of use for a dispensable personal care product wherein the dispensing assembly includes a base having a housing having an outer surface, a first side having a container receiving feature, a second side having a substantially flat surface, and a cavity between the first side and the second side, wherein the substantially flat surface is configured for selective fixed attachment to an external mounting fixture, the assembly also including a retention member for selectively receiving and retaining a container containing the dispensable personal care product.

23 Claims, 7 Drawing Sheets

(56) References Cited

U.S. PATENT DOCUMENTS

| | | | |
|---|---|---|---|
| 6,139,558 A | 10/2000 | Wagner | |
| 6,290,158 B1 | 9/2001 | Huang | |
| 6,318,566 B1 * | 11/2001 | Davis | A47F 7/286 211/11 |
| 6,419,175 B1 * | 7/2002 | Rankin, VI | A45F 5/004 242/373 |
| 7,053,774 B2 * | 5/2006 | Sedon | A47F 7/024 206/807 |
| 7,195,413 B2 * | 3/2007 | Kremizis | A45F 5/004 224/162 |
| D569,547 S * | 5/2008 | Jones | D27/161 |
| 7,478,776 B2 * | 1/2009 | Salentine | A45F 5/004 224/162 |
| 8,079,478 B2 * | 12/2011 | Short | A45D 40/0087 206/734 |
| 8,196,746 B2 | 6/2012 | Storandt | |
| 8,292,097 B2 * | 10/2012 | Goldberg | A47F 7/024 206/560 |
| 8,647,606 B1 | 2/2014 | Postlewaite | |
| 8,678,255 B2 | 3/2014 | Zhang et al. | |
| 8,763,819 B2 * | 7/2014 | Theisen | A47F 5/0025 211/119.003 |
| 9,474,391 B2 * | 10/2016 | Leyden | A47F 7/024 |
| 2002/0027113 A1 * | 3/2002 | Lacout | A47F 7/286 211/60.1 |
| 2002/0088474 A1 | 7/2002 | Montalvo | |
| 2004/0091432 A1 | 5/2004 | Dulin | |
| 2005/0011982 A1 * | 1/2005 | Salentine | A45F 5/004 242/379.2 |
| 2006/0139170 A1 * | 6/2006 | Ott | G08B 13/1445 340/568.2 |
| 2006/0225766 A1 | 10/2006 | Iderstine | |
| 2009/0178691 A1 | 7/2009 | Van Iderstine | |
| 2012/0055497 A1 | 3/2012 | Hurwitz | |
| 2012/0272996 A1 | 11/2012 | Jimenez et al. | |
| 2013/0213416 A1 | 8/2013 | Ahmet | |

* cited by examiner

ASSEMBLY AND METHOD OF USE FOR A CONVENIENT PERSONAL CARE PRODUCT STORAGE AND DISPENSARY

CROSS-REFERENCE TO RELATED APPLICATIONS

This application claims the benefit of U.S. Provisional Application No. 61/991,907, filed on May 12, 2014, the disclosure of which is incorporated herein by reference.

FIELD

The present disclosure relates to dispensable personal care products and, more specifically, to assemblies for providing convenient use of dispensable personal care products.

BACKGROUND

The statements in this section merely provide background information related to the present disclosure and may not constitute prior art.

Personal care products of all types are generally sold to consumers in packaging for their personal use. For example, solutions and products for fresh breath or breath fresheners such as breath spray or gum packets are generally small in size and sold at the retail level such as point of display or point of sale locations. After purchase, these personal care products are often used in a user's daily routine and are often placed on a person such as a pocket, on countertops, in handbags, in car consoles, and in desk drawers for easy access and storage between uses so that the purchaser can keep track of its location. For example, in one area is that of oral hygiene. Oral hygiene products are small and can be hard to keep track of, especially when the user needs them the most. Whether the disposable personal care product is gum, breath sprays, or breath mints, a user often forgets to transfer the product from one location to the next where it will be required to be used. Car doors, coat pockets, and desk drawers are just a few places where we store these items. Regardless, often these personal care products are misplaced or not easily available to the user when the user wants to use the product or it is not convenient, as the product is remote or forgotten. Often the products are simply out of reach of the user which reduced the use by the user and therefore the benefits of its use by the user.

Therefore there is a need for a product delivery, storage and convenient dispensing of various personal care products for users after the purchase of the personal care product.

SUMMARY

The inventor hereof has succeeded at designing a personal care product storage and delivery assembly and method of use that provides for increased availability and convenience of use after the user has purchased the personal care product.

According to one aspect, an assembly for a dispensable personal care product having a base having a housing having an outer surface, a first side having a container receiving feature, a second side having a substantially flat surface, a cavity between the first side and the second side, wherein the substantially flat surface is configured for selective fixed attachment to an external mounting fixture, the assembly also including a retention member for selectively receiving and retaining a container containing the dispensable personal care product within the container receiving feature of the base.

According to yet another aspect, a method of providing a dispensable personal care product for selective dispensing by a user. The method including the step of providing a base having a housing having an outer surface, the housing including a first side having a container receiving feature, a second side having a substantially flat surface, a cavity between the first side and the second side, the substantially flat surface being configured for selective fixed attachment to an external mounting fixture. The method also including the steps of selectively receiving and retaining a container containing the dispensable personal care product by a retention member and selectively affixing the housing to the external mounting surface. The method also including the step of selectively withdrawing the container from the container receiving feature of the housing for dispensing of the dispensable personal care product container therein by the user.

Further aspects of the present disclosure will be in part apparent and in part pointed out below. It should be understood that various aspects of the disclosure may be implemented individually or in combination with one another. It should also be understood that the detailed description and drawings, while indicating certain exemplary embodiments, are intended for purposes of illustration only and should not be construed as limiting the scope of the disclosure.

BRIEF DESCRIPTION OF THE DRAWINGS

FIG. 3 includes FIG. 3A a side perspective view, FIG. 3B a top view, FIG. 3C a front view and FIG. 3D a side cross-sectional view of an assembly for a dispensable personal care product with the container placed on the base according to one exemplary embodiment.

FIG. 4 includes FIG. 4A showing a bottom perspective view of the base with a back cover removed and FIG. 4B showing the back cover mounted to the base according to one exemplary embodiment.

FIG. 5 includes FIG. 5A a side perspective view, FIG. 5B a top view, FIG. 5C a front view and FIG. 5D a side cross-sectional view of another embodiment of an assembly for a dispensable personal care product with the container placed on the base according to another exemplary embodiment.

FIG. 6 includes FIG. 6A a front perspective view of a container removed from a base and FIG. 6B a top perspective close up view of a base of FIG. 6A of yet another embodiment of an assembly for a dispensable personal care product according to another exemplary embodiment.

FIG. 7 includes a set of photographs in FIGS. 7A, 7B, 7C and 7D illustrating uses of various assemblies for a dispensable personal care product according to exemplary embodiments thereof.

It should be understood that throughout the drawings, corresponding reference numerals indicate like or corresponding parts and features.

DETAILED DESCRIPTION

The following description is merely exemplary in nature and is not intended to limit the present disclosure or the disclosure's applications or uses.

In one embodiment, an assembly for a dispensable personal care product. This can be for any personal care product, and can include, by way of example and not limited thereto, an oral hygiene product, a hand sanitizer, a lip balm, a breath mint, and a gum. The disposable product container can be of any shape and in some instances can be a unique design to fit only into a container receiving feature of the base. The container can hold a liquid or portions of the personal car product, but in some embodiments is small such as for a few uses, such as a liquid with only 10 to 15 sprays or drops, by way of example. The container can be refillable, but can in some embodiments be highly disposable and therefore configured and made of less expensive disposable materials. As the containers can be purchased at POS locations, each container can be initially packages and sold with a tamper proof seal or feature as is common in the personal care products packaging industry. In some embodiments, the assembly can be used for a personal care product in markets with high turnover such that the personal care delivery assembly is provided in small disposable spray or dispensing bottles that can easily be replaced. For example, this can be of a size not exceeding 0.5 mL of liquid spray in each bottle (10-15 sprays). In other embodiments, the container and base can be configured to be larger such as the container being 5 to 7 mL of liquid or 100-150 sprays/doses.

The assembly includes a base having a housing having an outer surface, the housing including a first side having a container receiving feature and a second side having a substantially flat surface. The base with the container can be placed by the bedside in the living quarters, or the dashboard of a vehicle so that the user has the option to apply the breath spray while attached to the base, or simply unhook the container and use on the go. The base can be provided with one or more mounting devices, such can, in some embodiments, be configured so as to not cause damage to the mounting surface. The base can be dimensioned so that it is not larger than the diameter of the container in some embodiments so as to not require significant additional space.

In such embodiments, the base acts as a stand or mountable holder for the disposable personal care product container. The base provides for an ensured location of the personal care product for use by the user at the location to which it is mounted, and therefore becomes location specific and is no longer position portable beyond the proximity of the base. As noted, the base can have any shape and the container receiving feature of the base generally is dimensioned and configured to have a unique design or shape in some embodiments that only fit the disposable personal care product container to ensure appropriate refills and replacements thereof and use with the intended product or products. A different container receiving feature can be provided or in some embodiments. The container receiving feature can be adapted through use of sleeves or adaptors to different products or different shaped containers. In one embodiment, the container receiving feature is a container receiving cavity dimensioned and or otherwise configured for receiving a cylindrical shaped container of dispensable personal care product.

The base can be of any design, but as the base and held product will often be mounted in a visible and easy access location, the design of the base, other than being functional, can have a unique and aesthetically pleasing design that can, in some embodiments, be adapted to the mounting location or use. Such mounting locations for particular use can include a location on a plane, a train, in a hotel or hospital room, in an office, in a restroom, in kitchen, a vehicle such as a car, a rental car, a bus, a taxi cab, a delivery vehicle, on a bed or bed frame, or a wheelchair, by ways of example and not intending to be limited thereto. The mounting can be via an adhesive or hook and latch material, but can also include more permanent mounting such as with a screw or similar structural mounting element.

The base also can have a cavity as a part of the retention member defined at least in part between the first side and the second side and an orifice defined between the cavity and the outer surface, wherein the second can in different embodiments be either the back side or can be the bottom side. In one embodiment, the second side (either back side or bottom side) can have a substantially flat surface for selective fixed attachment to an external mounting fixture or surface. The retention member provides for selectively receiving and retaining a container containing the dispensable personal care product within the container receiving feature of the base.

The base can also include a mounting means such as a flat surface on the back or bottom for selectively mounting or affixing the base to a mounting surface such as a wall or a table or structural top. Such an embodiment for a mounting means can provide for a permanent mounting or can be a selective mounting that is configured to prevent damage to the mounting surface. As noted, the assembly base can be configured from a housing with an outer surface having a first side with the container receiving feature and a second side having a substantially flat surface. In some embodiments, the second side can be on an opposing side to the first side such as a back, or in other embodiments can be substantially perpendicular to the first side such as on a bottom. The housing and second side can be configured such as with a flat surface or one or more mounting features for selective attachment of a second side panel as the second side to complete the housing. The second side can be a substantially flat surface with an attachment means such as an adhesive, a hook and latch, a suction device, and a screw and/or slot formation.

The assembly can include the retention member that is of any suitable form or design enabling the selective receiving and retaining of the container in the container base receiving member. This can include a retractable string with clip for selective clipping to the container or a connection means associated therewith. The retention member selectively receives and retains the container in association with the base and in the container receiving feature when not in dispensing use by the user. The retention member can be of any suitable type includes clips, hook and latch, magnets, mating devices, as well as a string or other elongated member that selectively couples the container to the base.

In one embodiment, the retention member includes a retracting mechanism coupled positioned within the cavity of the housing. The retracting mechanism can include a wheel or spool or similar device with a receiving feature and a center axis for which the wheel is selectively rotatable within the cavity. The retention member can also include a spring means such as a coil spring by way of example that is coupled to the wheel for biasing the wheel in a first direction about the axis while enabling a rotation of the wheel in a second direction about the axis that is opposed to the first direction. The retention member can include an elongated flexible retention member such as a string, by way of example, having a first end coupled to the wheel of the retracting mechanism within the cavity, a second end having a container coupler positioned outside the housing for coupling to a container containing a dispensable personal care product, and a middle portion between the first end and the second end positioned for movement through the orifice. The wheel can be configured to retain a substantial portion of the elongated flexible retention member in the receiving feature when the wheel is rotated in a fully biased position in the first direction and dispensing all or a portion of the middle portion of the elongated flexible retention member when the wheel is selectably rotated in the second direction. In such embodiments, the housing can define a cavity a circular wheel cavity in which the wheel is retained during rotation.

The assembly can include a bobbin that is positioned proximate the orifice of the housing and the wheel wherein the bobbin has a bobbin cavity through which the middle portion of the elongated flexible retention member.

In another embodiment, a container coupler of the second end of the elongated flexible retention member can include a clip for selective attachment to coupler associated with the container. Such a container coupler can be coupled to the second end of the elongated flexible retention member. The container coupler of the second end of the elongated flexible retention member can include at least one of a hook and latch feature and a snap-hook feature for selectively retaining the container.

Where provided, the wheel fixture can be configured to rotate from the fully biased position to a dispensing position having all or the portion of the middle portion of the elongated flexible retention member extended from the orifice responsive to a removal of the container from the container receiving feature of the housing by a user.

The retention member can also be another embodiment such as a magnet for engaging a container or container mating portion, a hook and latch feature, a snap lock feature of the container with the container receiving feature, and a holster receiving feature.

Figure 1:
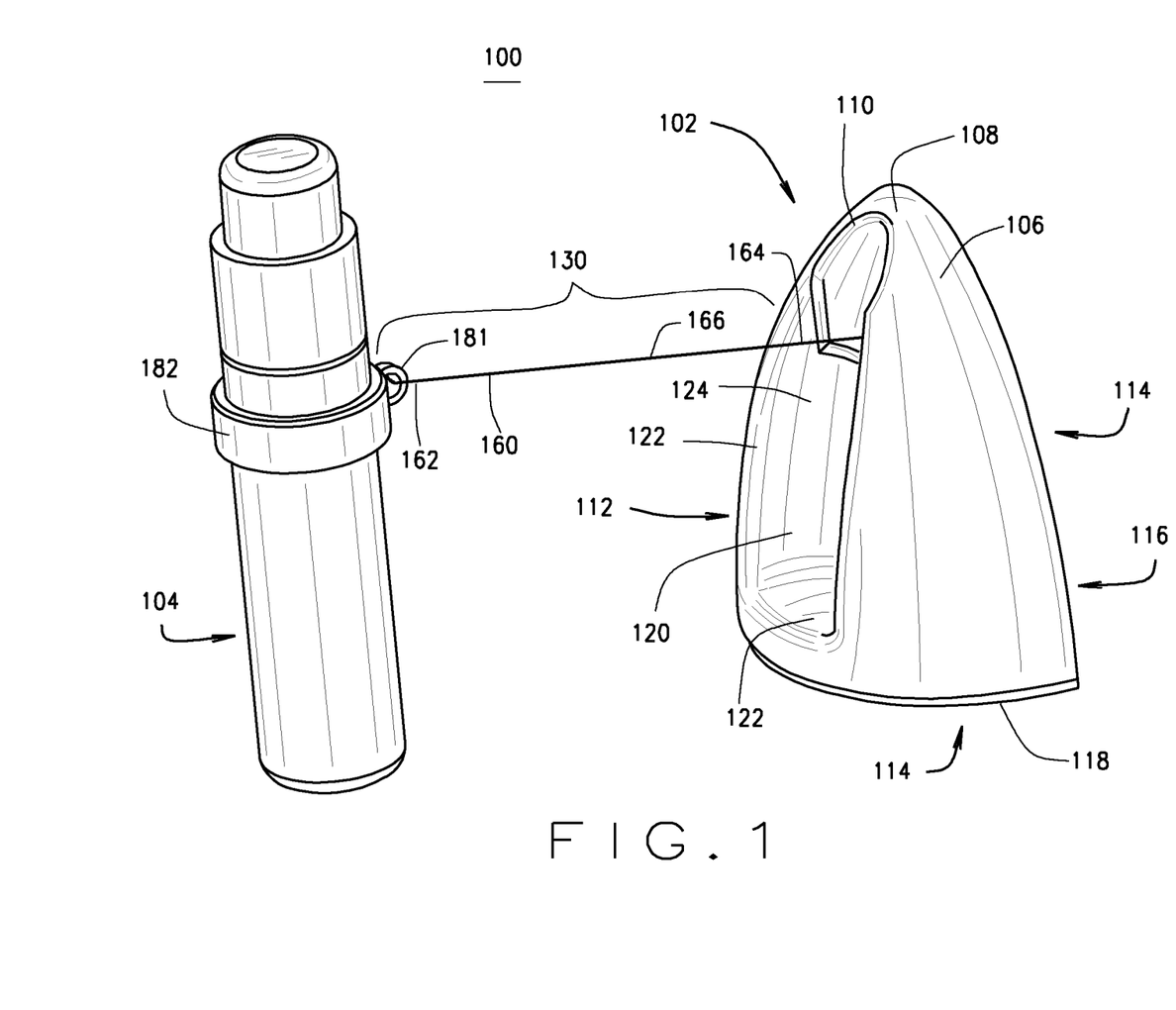
FIG. 1 is a side perspective view of an assembly for a dispensable personal care product illustrating the container removed from the base according to one exemplary embodiment.

Referring now to the exemplary embodiments of the above described assemblies and the below methods is provided by FIGS. 1-7. As shown in FIG. 1, an assembly 100 for a dispensable personal care product with a base 102 and a personal care product container 104. The base 102 has a housing 106 with an outer surface 108 defined by a body layer 110 or shell. The housing 106 has a first side 112 having a container receiving feature 120. A second side 114 can have a substantially flat surface such as shown either or as back side 116 or bottom (side) 118. A retention member 130 provides for selectively receiving and retaining the container 104 containing the dispensable personal care product within the container receiving feature 120 of the base 102. The container receiving feature 120 can be a container receiving cavity or indent such as having a bottom or floor 122 and a wall 124 with wall edge 122. The retention member 130 can include an elongated member 160 such as a string with a proximal end 164 coupled to the housing, a distal end 162 coupled to the container 104 and an intermediate portion 166 there between.

Figure 2:
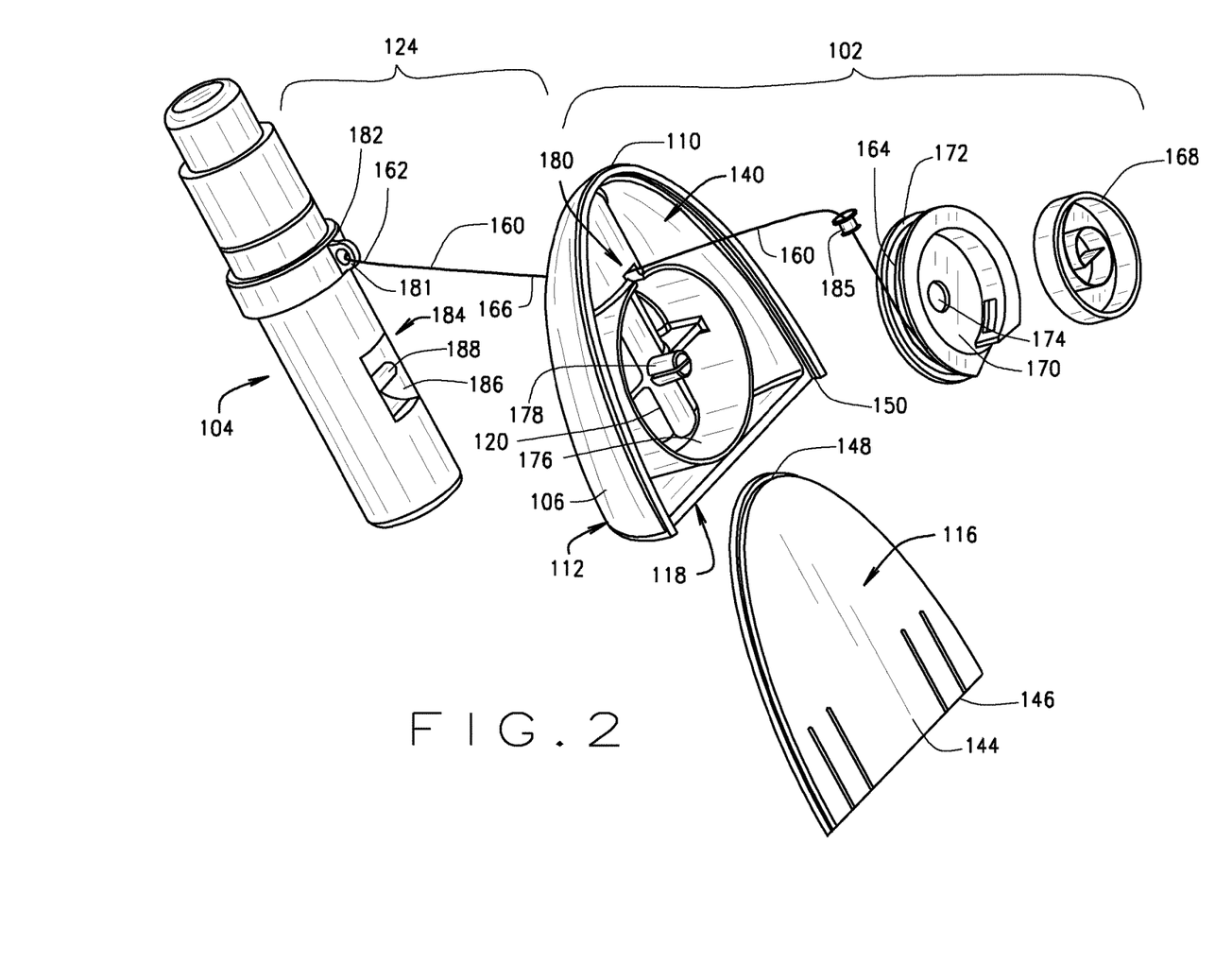
FIG. 2 is a back side perspective view of an assembly for a dispensable personal care product showing an exploded disassembled view of the base with the container removed from the base according to one exemplary embodiment.

FIG. 2 provides additional details as to the additional embodiments and features thereof of the assembly 100 and in particular features of base 102 and product container 104. In this embodiment, the housing 106 defines a cavity 140 defined within the housing. In some embodiments, an orifice 180 is also defined between the cavity 140 and the outer surface 108. The orifice 180 is positioned and configured for enabling the receipt and passage of the elongated member 160 therethrough. The substantially flat surface of the second side 114 can be configured for selective fixed attachment to an external mounting fixture (not shown in FIGS. 1 and 2 but shown in FIG. 7.

The retention member 130 can have a wheel 170 or similar rotating feature with a string channel 172 or other string capture feature about its outer perimeter. A wheel hub or hole 174 and a biasing device 168 can be provided, which in FIG. 2 is shown as a coil spring, for biasing the wheel 170 for retracting the elongated member 160 into the base 102 and biasing the container 104 thereto when not in use. The housing 106 can define a wheel cavity 176 within cavity 140 for rotation of the wheel 170 about wheel hub 178. The elongated member 160 such as a string 160 is fixed to the rotating wheel 170 on the proximal end 164 and threaded through a bobbin 185 and then through string orifice 180 and attached or coupled to the container 104 at the distal end 162 such as via a coupler 181 that may include a collar 182.

FIG. 2 also illustrates that the retention member 130 can include a snap or lock feature 184 that can include a container cavity 186 and protrusion 188 that couples or snap locks to a mating feature of the container receiving feature 120 of the container 104 in some embodiments. Also shown is a back plate 144 of the housing 106 of the base 102 that can be removed or added during assembly. The back plate 144 can have one or more snap retainer features 146 for selectively engaging an edge of the housing 106. The back plate 144 can include an edge protrusion 148 that can mate with a retaining channel 150 of the main portion of the housing 106.

Figure 3A:
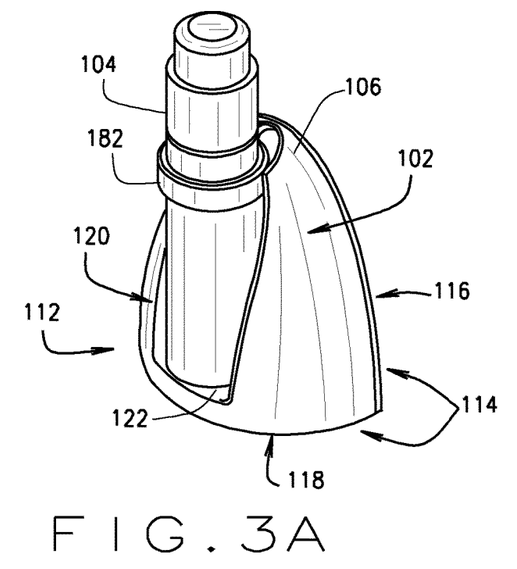
Figure 3B:
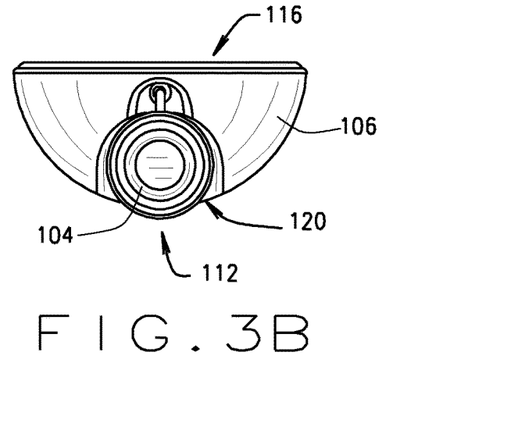
Figure 3C:
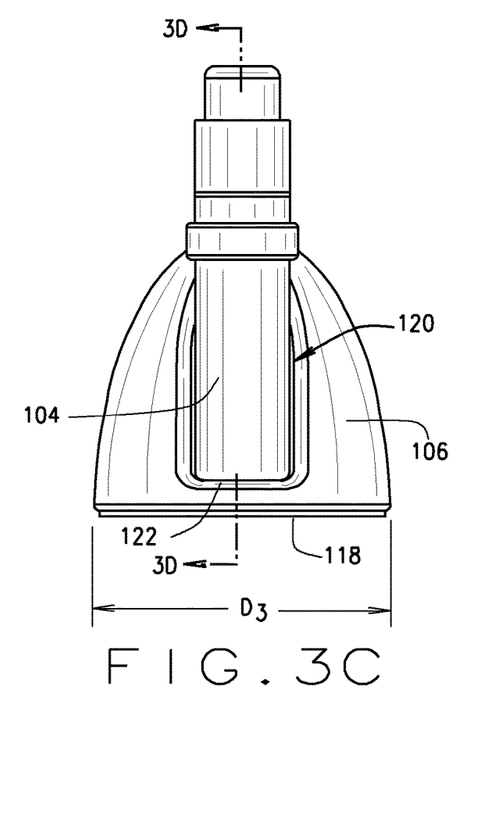
Figure 3D:
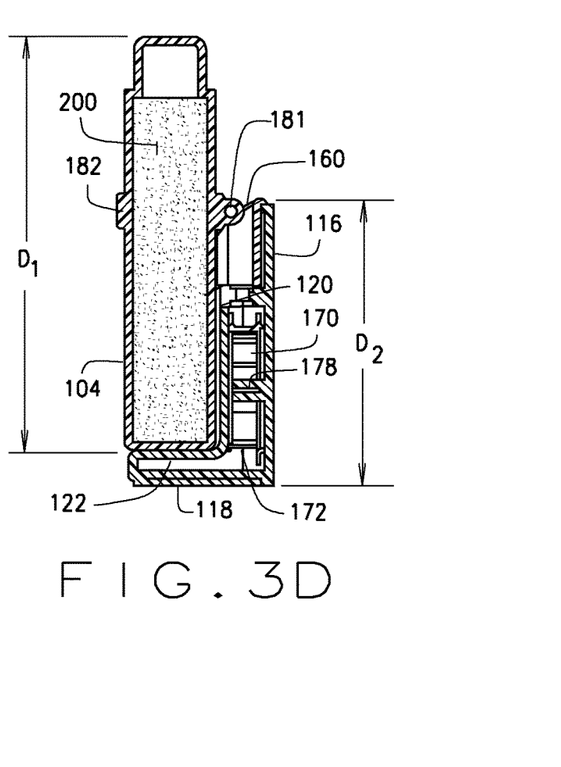

FIG. 3 that includes FIG. 3A, FIG. 3B, FIG. 3C, and FIG. 3D illustrates one embodiment for a dispensable personal care product assembly 100 with the container 104 placed on the base 102. As shown in FIGS. 3A, 3B and 3C, the product container 104 is positioned in the cavity 120 and the second sides 114 can be a back surface 116 or a bottom 118. The container is positioned in the cavity 120 and resting on the cavity bottom 122. The container 104 has the collar 182 and the cavity 120 is configured and dimension for receiving not only the container 104 but also the collar 182. FIG. 3D is a cross sectional view along section 3D of FIG. 3C. In this cross sectional view, the container 104 is shown to include a dispensable product 200. The container 104 has a height D1, the base had a width of D3 as shown in FIG. 3C and the base has a height D2. FIG. 3D also shows the cross sectional features of one embodiment of a retention member 130 with a wheel 170 mounted on a wheel hub 178

Figures 4A, 4B:
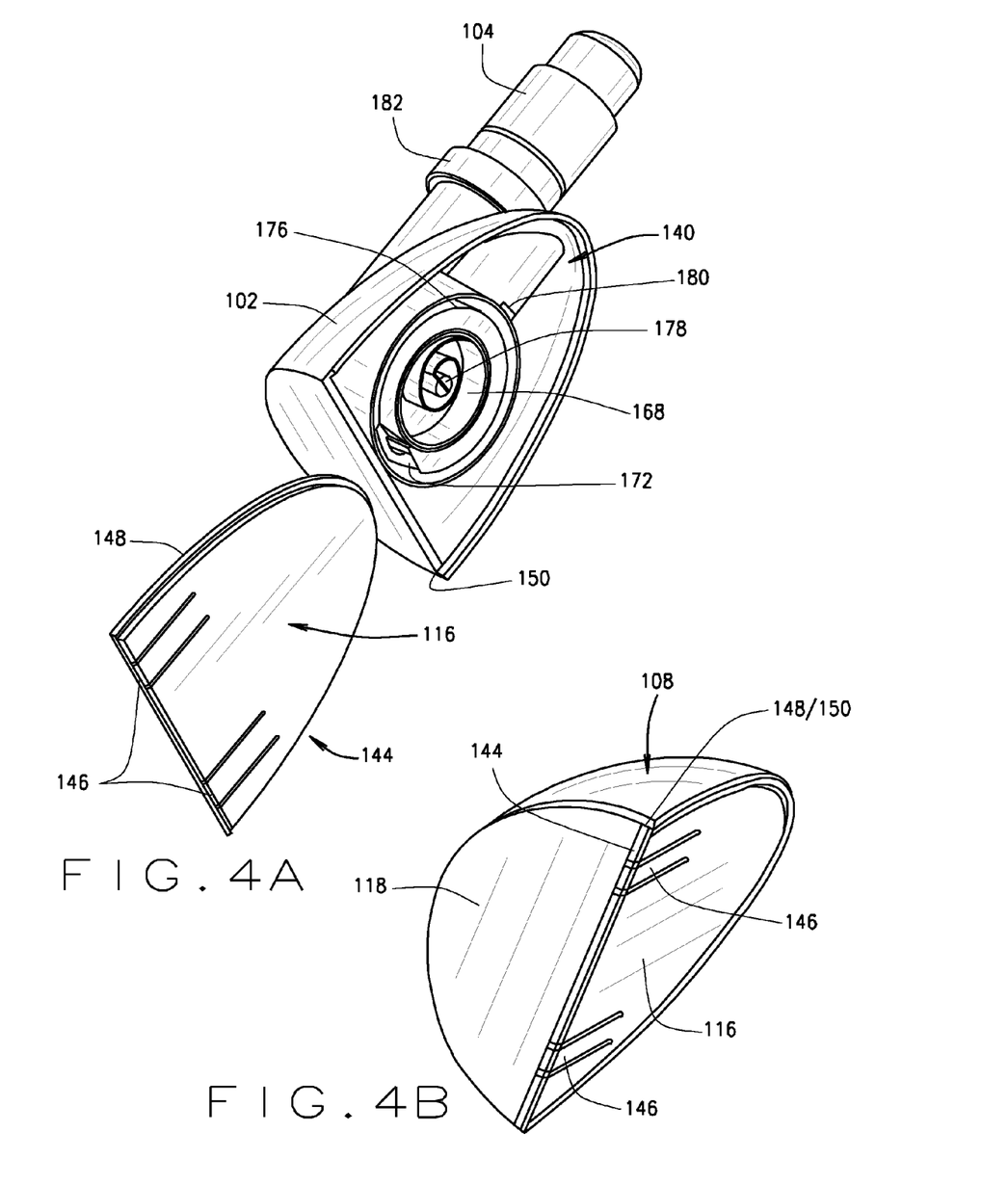
Figure 5A:
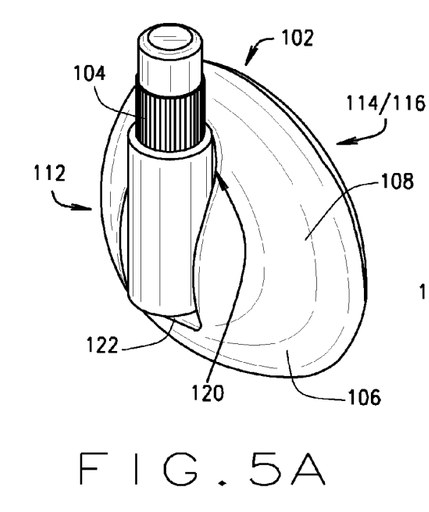
Figure 5B:
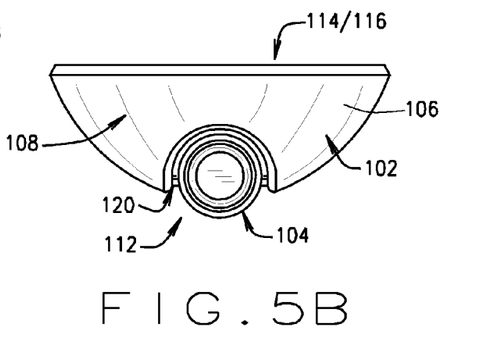
Figure 5C:
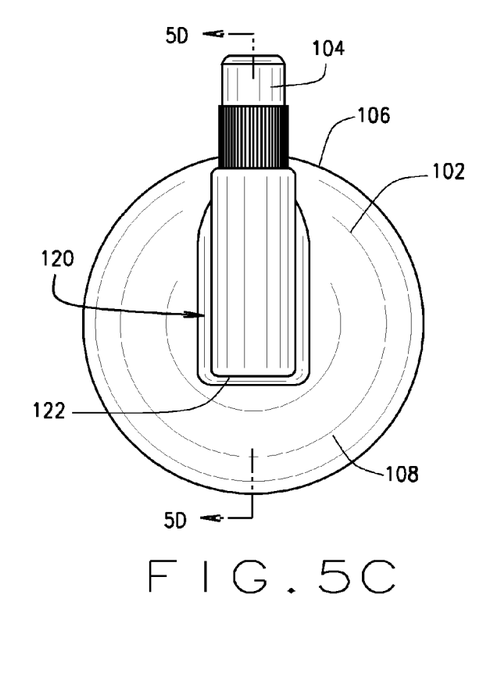
Figure 5D:
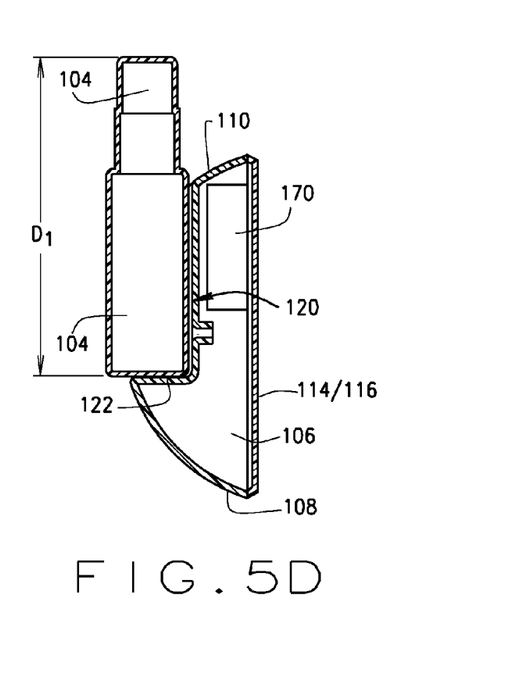

FIG. 4 that includes FIGS. 4A and 4B illustrates one embodiment of a back cover 144 and base attachment feature and arrangement for attaching the back cover 144 to the dispensable personal care product assembly base 102. The features shown in FIGS. 3 and 4 are similar to those described above as to FIGS. 1 and 2. As shown, the housing 106 defines the retaining channel 150 in which the edge protrusion 148 of the back plate 144 can be inserted during assembly. The back plate 116 is held in place via the snap retaining features 146. FIG. 4A shows the back plate 116 in the removed position and FIG. 4B shows the back plate 116 in the attached position.

FIG. 5 that includes FIG. 5A, FIG. 5B, FIG. 5C, and FIG. 5D illustrating another embodiment for a dispensable personal care product assembly 100 with the container 104 placed on the base 102. The features shown in FIG. 5 are similar to those described above as to FIGS. 1-4 except in this illustrate embodiment, the base 102 only has a single second side 114 that is the back side 116, with the base 102 having a round design without a defined flat bottom 118. In this embodiment, the back side 116 is configured for mounting the base 102 onto a wall or other vertical surface.

Figure 6A:
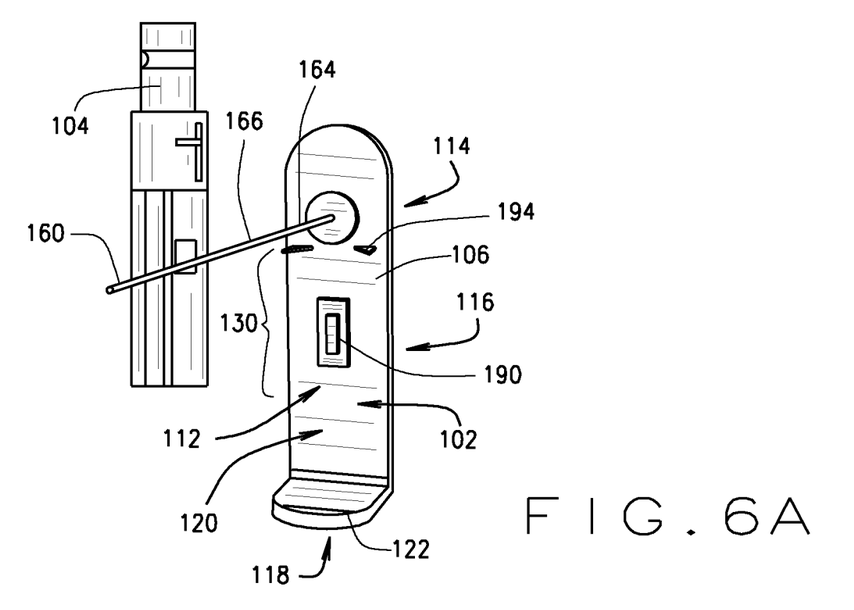
Figure 6B:
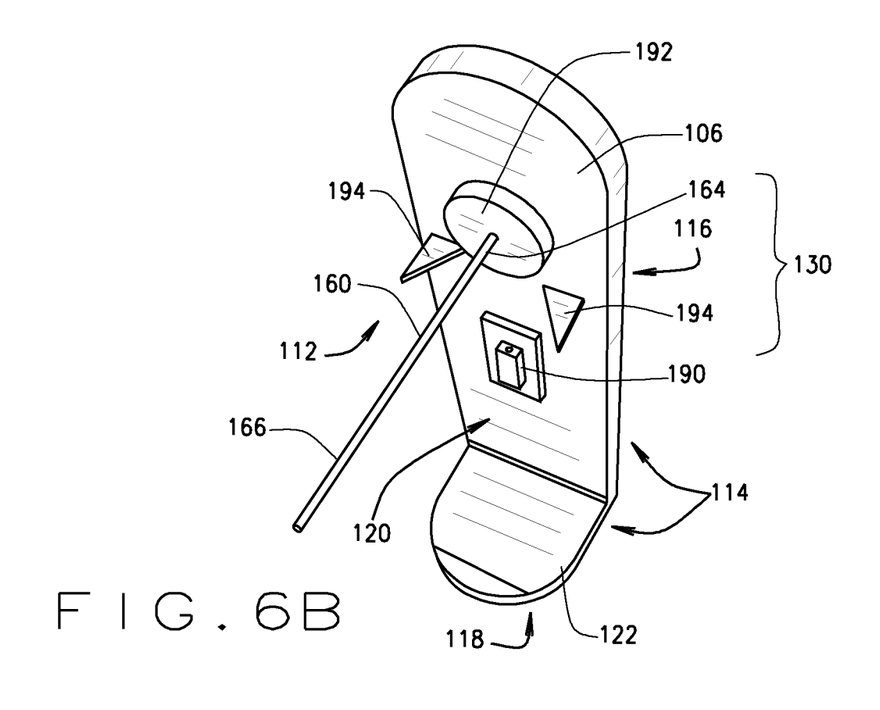

FIG. 6 that includes FIGS. 6A and FIG. 6B and illustrates yet another embodiment of an assembly 100 for a dispensable personal care product 200. This embodiment includes a simplified substantially L-shaped base 102 without a cavity 140 that is broadly defined by the base 102. The container receiving feature 120 has the container receiving cavity bottom 122 upon which the container 104 rests. The retention member 130 is positioned within the container receiving feature 120 (also referred to as a container receiving cavity) such as via a latching or magnetic coupling mechanism 190 and with side retaining members 194 and/or a string or magnetic coupler 192. The container 104 can have mating or related features for securing the container 104 therewith.

Figure 7A:
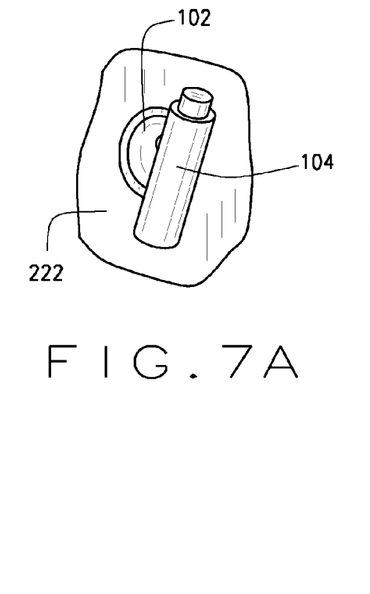
Figure 7B:
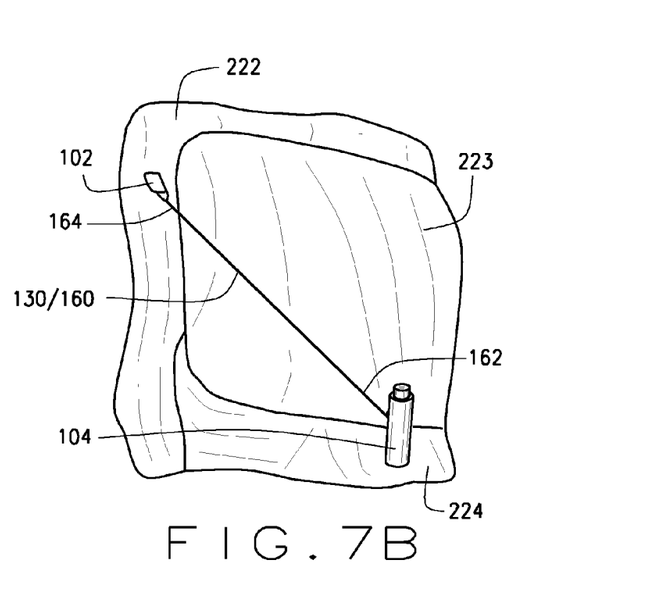
Figure 7C:
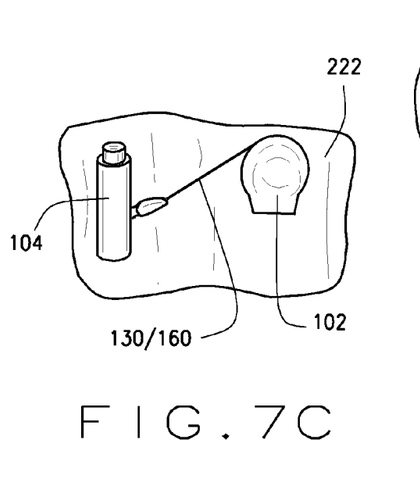
Figure 7D:
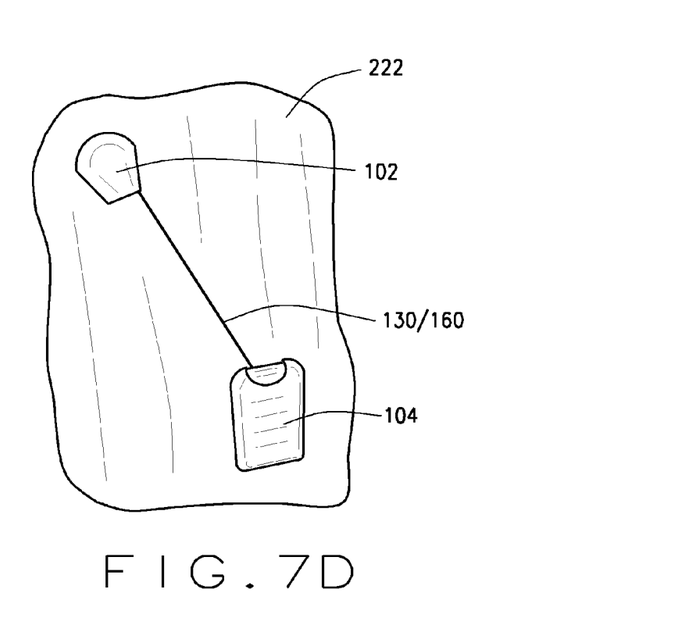

FIG. 7 that includes FIGS. 7A, 7B, 7C and 7D that illustrate various operational uses of the various embodiments of assemblies for a dispensable personal care product 100 according to this disclosure. As shown in FIG. 7A, the base 102 can be mounted on a wall 222 with the container 104 mounted to the base 102 such as within the container receiving feature 120 as described above, by ways of example. FIG. 7B illustrates the base being mounted on a wall 222 next to a bed 224 at or near a pillow 223 or head of the bed 224. The container 104 is illustrated as being withdrawn from the container receiving feature 120 of the wall mounted base 102 during use in close proximity to the head of the bed 224. FIG. 7C illustrates the base 102 being mounted on a wall and shows the coupling of the retention member 130 to the container 104 during use that couples the container 104 to the base 102 via a string 160. FIG. 7C shows another similar embodiment.

In one embodiment, an assembly 100 is both a delivery and holding device for oral breath spray 200. The user can apply breath spray 200 simply by extending a biased coupling string onsite, or by unhooking the bottle or container 104 and using it on the go. The assembly 100 as described herein provides a reliable location where the dispensable product 200 will always be found. The dispensable product 200 can be configured with a custom container 104 that is exclusive to the base 102, such as having a unique shape for the container 104 to be received within the container receiving feature 120.

In another embodiment, a method of providing a dispensable personal care product 200 for selective dispensing by a user, such as one or more embodiments, examples of which are described above by way of example. The method including the step of providing a base 102 having a housing 106 having an outer surface 108, the housing 106 including a first side 112 having a container receiving feature 120, a second side 114 having a substantially flat surface, a cavity 140 defined within the housing and an orifice 180 defined between the cavity 140 and the outer surface 108, the substantially flat surface of the second side 114 being configured for selective fixed attachment to an external mounting fixture. The method also including the steps of selectively receiving and retaining a container 104 containing the dispensable personal care product 200 by a retention member 130 and selectively affixing the base 102 such as the housing 106 to the external mounting surface. The method also including the step of selectively withdrawing the container 104 from the container receiving feature 120 of the housing 106 for dispensing of the dispensable personal care product container 104 therein by the user.

The method can include the selective retaining providing a retracting mechanism that is in a coupled positioned within the cavity, the retracting mechanism including a wheel 170 with a receiving feature 172 and a center axis for which the wheel 170 is selectively rotatable within the cavity 140/172. The method can also include biasing the wheel 170 with a spring means 168 coupled to the wheel 170. The biasing of the wheel 170 can be in a first direction about the axis while enabling a rotation of the wheel 170 in a second direction about the axis that is opposed to the first direction. The selective retaining can also include an elongated flexible retention member 160 having a first end 164 coupled to the wheel 170 of the retracting mechanism within the container receiving feature 120, a distal end 162 having a container coupler 181 positioned outside the housing 106 for coupling to a container 104 containing a dispensable personal care product 200, and a middle portion 166 between the first end and the second end positioned for movement through the orifice 180, The wheel 170 can be configured for retaining a substantial portion of the elongated flexible retention member 160 in the container receiving feature 120 when the wheel 170 is rotated in a fully biased position in the first direction and for dispensing all or a portion of the middle portion 166 of the elongated flexible retention member 160 when the wheel 170 is selectably rotated in the second direction.

The method step of withdrawing can include removing all or a portion of the middle portion 166 of the elongated flexible retention member 160 through the orifice 180 and from the wheel 170. The method can further include dispensing a portion of the personal care product 200 from the container 104 after the withdrawing, and replacing the container 104 into the container receiving feature 120. The replacing can include retracting the removed all or portion of the middle portion 166 of the elongated flexible retention member 160 through the orifice 180 and back onto the wheel 170.

The method can also include attaching a container 104 to the container coupler 181 of the distal end 162 of the elongated flexible retention member 160. The method of attaching a container 104 to the container coupler 181 can include attaching using a magnet, a hook and latch feature, a snap lock feature, or placement in a holster receiving feature of the base 102, or a combination of any such retainer arrangement that may be suitable for the particular container 104 configured for use with the base 102.

The method of selectively affixing the housing 106 to the external mounting surface 222 can include coupling using an attachment means selected from the group consisting of an adhesive, a hook and latch, a suction device, and a screw.

In some embodiments, the container coupler 181 can includes a clip on the distal end 162 of the elongated flexible retention member 160. In such embodiments, the method of attaching the container 104 to the container coupler 181 can include selectively clipping a clip on the distal end 162 to a coupler 182 associated with the container 104. The method step of selectively retaining the container 104 can include the method of selectively placing a collar 182 or similar container capturing assembly about all or at least a portion of the body of the container 104. The method of selectively retaining the container 104 can include using a magnet, a hook and latch feature, a snap lock feature, and a holster as the receiving feature.

Uses of the assembly can include commercial markets such as hotel rooms, transportation (airliners, buses, trains, rental cars, etc.), corporate delivery vehicles (UPS, FEDEX, US POSTAL), hospitals, rehabilitation facilities, community facilities, cruise liners, by way of example. Use of the assembly can include personal market locations such as bedside, guest bathroom, university bookstore, dorms, university house, car (dashboard/headrest), office desk, backpack or handbag.

When describing elements or features and/or embodiments thereof, the articles "a", "an", "the", and "said" are intended to mean that there are one or more of the elements or features. The terms "comprising", "including", and "having" are intended to be inclusive and mean that there may be additional elements or features beyond those specifically described.

Those skilled in the art will recognize that various changes can be made to the exemplary embodiments and implementations described above without departing from the scope of the disclosure. Accordingly, all matter contained in the above description or shown in the accompanying drawings should be interpreted as illustrative and not in a limiting sense.

It is further to be understood that the processes or steps described herein are not to be construed as necessarily requiring their performance in the particular order discussed or illustrated. It is also to be understood that additional or alternative processes or steps may be employed.

What is claimed is:

1. An assembly for a dispensable personal care product contained within a disposable container, the assembly comprising:
    a base including a housing having an outer surface, the housing having a front side, a back side opposing the front side, a top side, and a bottom side opposing the top side, the front side being a first side that defines a container receiving feature having a container receiving floor and at least one container receiving side about the received container providing for self-supporting and at least partial retention of the received container; each of the back side and the bottom side having a substantially flat surface with both the back side and bottom side being configured for selection by the user to be a second side of the housing having a substantially flat surface for attachment to an external mounting fixture, and a cavity defined within the housing between the front side and the back side of the housing, the housing cavity including a circular shaped wheel cavity with a centered wheel hub therein; and
    a retention member for selectively receiving the disposable container containing the dispensable personal care product within the container receiving feature of the housing and once received therein retaining the disposable container within the container receiving feature through resting of the disposable container on the container receiving floor and by the at least on container receiving side and through biasing the container receiving feature therein, the retention member having a retracting mechanism positioned within the cavity of the housing between the container receiving feature on the front side and the back side of the housing, the retracting mechanism having a wheel is selectively rotatable within the wheel cavity of the housing and having a center hole for rotationally mounting on the wheel hub, the wheel having an outer channel as a receiving feature for receiving the retention member, and a coil spring located within a spring cavity defined by the wheel, the coil spring being a wheel rotation biasing device biasing the wheel in a first direction about the axis, the retention feature selectively attaching and detaching the disposable container for easy replacement of the dispensable personal care product in the disposable container by a user of the assembly, and an elongated flexible retention member coupling the selective attaching feature to the retracting mechanism of the base and wherein the retracing mechanism biasing the received disposable container within the container receiving feature while enabling rotation of the wheel about the wheel hub in a second and opposite direction about the axis for enabling selective removal of the disposable container from the container receiving feature against the bias of the first direction of rotation;
    wherein upon user selection the back side of the housing comprises the second side of the housing and is configured for attachment to a vertically oriented external mounting surface wherein a first vertical surface mounting orientation of the assembly to the external mounting feature is facilitated, and in the alternative wherein upon user selection the bottom side of the housing comprises the second side of the housing and is configured for attachment to a horizontally oriented external mounting surface wherein a second horizontal surface mounting orientation of the assembly to the external mounting feature is facilitated, the container receiving feature's floor and at least one container receiving side providing for self-supporting and at least partial retention of the received container in both the first vertical and the second horizontal surface mounting orientations.

2. The assembly of claim 1 wherein the dispensable personal care product is an oral hygiene product having a unique shape and wherein the container receiving feature including the floor and the at least one side thereof and the retention feature are dimensioned and configured to only fit the unique shape of the oral hygiene product.

3. The assembly of claim 1 wherein the housing and the second side are each configured for selective attachment of an additional separate panel to the second side of the housing.

4. The assembly of claim 1 wherein the bottom side of the housing is substantially perpendicular to the back side of the housing.

5. The assembly of claim 1 wherein the container receiving feature comprises a container receiving cavity configured for receiving a cylindrical shaped container of a dispensable personal care product and the retention member is positioned within the container receiving cavity for biasing the container to be retained within the container receiving cavity.

6. The assembly of claim 1 wherein the substantially flat surface of the second side of the housing includes an attachment means selected from the group consisting of an adhesive, a hook and latch, a suction device, and a screw.

7. The assembly of claim 1:
    wherein an orifice is defined within the housing between the cavity and the container receiving feature,
    wherein the elongated flexible retention member has a first end coupled to the wheel of the retracting mechanism within the wheel cavity of the housing cavity, a second end having a container coupler positioned outside the housing for user selectable attachment and detachment of the disposable container containing the dispensable personal care product, and a middle portion between the first end and the second end positioned for movement of the elongated flexible retention member through the orifice, and
    wherein the outer channel of the wheel is configured for retaining a substantial portion of the elongated flexible retention member in the receiving feature when the wheel is fully rotated in the first direction for retaining the received disposable container within the container receiving feature and for dispensing all, or a portion, of the middle portion of the elongated flexible retention member when the wheel is selectably rotated in the second direction.

8. The assembly of claim 1 wherein the housing defines, within the cavity between the container receiving feature and the back side of the housing, a circular wheel cavity having the wheel hub and in which the wheel with the coil spring located within the cavity of the wheel hub is retained during rotation.

9. The assembly of claim 1 wherein the wheel hub is configured for receiving a mounting of a center end of the coil spring.

10. The assembly of claim 1 wherein a bobbin is positioned proximate the orifice into the container receiving feature from the cavity and the wheel, the bobbin including a bobbin cavity through which the middle portion of the elongated flexible retention member passes.

11. The assembly of claim 1 wherein the elongated flexible retention member is a string.

12. The assembly of claim 1 wherein the container coupler of the second end of the elongated flexible retention member enables selective attachment and detachment to the disposable container by a user of the dispensable personal care product and includes at least one of a clip for selective attachment to a coupler associated with the disposable container, a collar for selectively retaining the disposable container, a hook and latch feature, and a snap-hook feature for selectively retaining the disposable container.

13. The assembly of claim 1 wherein the wheel is configured to rotate from the wheel's fully biased position providing retention of the disposable container within the container receiving feature to a dispensing position wherein all, or a portion, of the middle portion of the elongated flexible retention member extends from the orifice within the container receiving feature to the cavity in response to removal of the disposable container from the container receiving feature of the housing by a user.

14. The assembly of claim 1 wherein the retention member is selected from the group consisting of a magnet, a hook and latch feature, a snap lock feature, and a holster receiving feature.

15. The assembly of claim 1 wherein the personal care product is selected from the group consisting of an oral hygiene product, a hand sanitizer, and a lip balm.

16. A method of providing a dispensable personal care product for selective dispensing by a user comprising:

providing a base including a housing having an outer surface, a front side, a back side opposing the front side, a top side, and a bottom side opposing the top side, the front side defining a container receiving feature having a container receiving floor and at least one container receiving side about the received container; each of the back side and the bottom side having a substantially flat surface with one of said back side and bottom side comprising a second side of the housing configured for mounting to an external mounting feature, and a cavity defined within the housing between the front side and the back side of the housing with the cavity including a circular shaped wheel cavity with a centered wheel hub therein, the substantially flat surfaces of the bottom side and the back side are each configured upon user selection to be the second side of the housing enabling a user to selectively attach the housing to an external mounting fixture wherein upon user selection the back side of the housing comprises the second side of the housing, a first vertical surface mounting orientation of the assembly to the external mounting feature that is vertical is facilitated, and in the alternative wherein upon user selection the bottom side of the housing comprises the second side of the housing, a second horizontal surface mounting orientation of the assembly to the external mounting feature that is horizontal is facilitated, the container receiving feature having a container receiving floor and at least one container receiving side about the received container providing for self-supporting and at least partial retention of the received container in both the first vertical and the second horizontal surface mounting orientations, the base further having a retracting mechanism contained within the cavity of the housing, the retracting mechanism having a wheel selectively rotatable within the wheel cavity of the housing and having a center hole for rotationally mounting on the wheel hub, the wheel having an outer channel as a receiving feature for receiving the retention member, and a coil spring located within a spring cavity defined by the wheel, the coil spring being a wheel rotation biasing device biasing the wheel in a first direction about the axis, selectively attaching and detaching the disposable container containing the dispensable personal care product by a retention member coupled to the retracting mechanism of the base by an elongated flexible retention member;

selectively affixing the second side of the housing to the external mounting surface;

receiving the disposable container within the container receiving feature in part through a biasing provided by the retracting mechanism biasing the attached disposable container into the container receiving feature and in other part through user placement of the disposable container;

retaining the received disposable container within the container receiving feature through the biasing provided by the retracting mechanism; and selectively withdrawing the container from the container receiving feature of the housing for dispensing of the dispensable personal care product contained within the disposable container by the user.

17. The method of claim 16:

wherein the biasing includes the first direction about the axis that provides the biasing of the container retaining the received disposable container within the containing receiving feature while enabling a rotation of the wheel in a second and opposite direction about the axis enabling the selective removal of the disposable container from the container receiving feature against the bias of the first direction, wherein an orifice is defined in the housing between the cavity and the container receiving feature and the retaining also including the elongated flexible retention member having a first end coupled to the wheel of the retracting mechanism within the cavity, a second end having a container coupler positioned outside the housing for user selectable attachment and detachment of the disposable container containing the dispensable personal care product, and a middle portion between the first end and the second end positioned for movement through the orifice of the container receiving feature for providing the biased retention of the container in the container receiving feature, and wherein the outer channel of the wheel is configured for retaining a substantial portion of the elongated flexible retention member in the wheel receiving feature when the wheel is rotated in a fully biased position in the first direction for retaining the received disposable container within the container receiving feature and for dispensing all or a portion of the middle portion of the elongated flexible retention member when the wheel is selectably rotated in the second direction.

18. The method of claim 17, wherein the withdrawing includes removing all, or a portion, of the middle portion of the elongated flexible retention member through the orifice and from the wheel; the method further comprising:
dispensing a portion of the personal care product from the disposable container after the withdrawing; and
replacing the container into the container receiving feature, the replacing including retracting the removed all, or portion, of the middle portion of the elongated flexible retention member through the orifice and back onto the biased wheel for the biased retaining of the container within the container receiving feature.

19. The method of claim 17, wherein the selective attaching and detaching of the disposable container to the container coupler is to the second end of the elongated flexible retention member and wherein the method of selectively attaching and detaching a disposable container to the container coupler includes attaching and detaching using at least one of a magnet, a hook and latch feature, a snap lock feature, and a holster receiving feature.

20. The method of claim 19 wherein the personal care product is an oral hygiene product and the container is a disposable container of the oral hygiene product wherein the detaching by all users of the assembly includes detaching a first container and the attaching includes attaching a second container, each of the first container and the second container containing the dispensable product.

21. The method of claim 17 wherein the container coupler includes a clip on the second end of the elongated flexible retention member and wherein attaching the disposable container to the container coupler includes selectively attaching and detaching a clip on the second end to a coupler associated with the disposable container.

22. The method of claim 16 wherein selectively affixing the housing to the external mounting surface includes coupling using an attachment means selected from the group consisting of an adhesive, a hook and latch, a suction device, and a screw.

23. The method of claim 16 wherein the selectively attaching and detaching the disposable container includes at least one of selectively attaching using a collar, a magnet, a hook and latch feature, a snap lock feature, and a holster receiving feature.

* * * * *